US008308572B2

(12) United States Patent
McKenna et al.

(10) Patent No.: US 8,308,572 B2
(45) Date of Patent: Nov. 13, 2012

(54) GAMING SYSTEM WITH END USER FEEDBACK FOR A COMMUNICATION NETWORK HAVING A MULTI-MEDIA MANAGEMENT

(75) Inventors: Daniel Bernard McKenna, Vail, CO (US); James Michael Graziano, Hotchkiss, CO (US)

(73) Assignee: Lava Two, LLC, Vail, CO (US)

( * ) Notice: Subject to any disclaimer, the term of this patent is extended or adjusted under 35 U.S.C. 154(b) by 160 days.

(21) Appl. No.: 12/675,366

(22) PCT Filed: Aug. 31, 2007

(86) PCT No.: PCT/US2007/077405
§ 371 (c)(1),
(2), (4) Date: Feb. 25, 2010

(87) PCT Pub. No.: WO2009/029108
PCT Pub. Date: Mar. 5, 2009

(65) Prior Publication Data

US 2011/0045910 A1 Feb. 24, 2011

(51) Int. Cl.

| | |
|---|---|
| ***A63F 13/00*** | (2006.01) |
| ***A63F 9/24*** | (2006.01) |
| ***G06F 17/00*** | (2006.01) |
| ***G06F 19/00*** | (2006.01) |
| *A63F 13/12* | (2006.01) |

(52) U.S. Cl. ................ 463/42; 463/23; 463/25; 463/29; 463/39; 273/138.2; 273/141 A; 273/460; 705/56; 705/67; 705/74; 705/78; 709/203; 709/205; 709/207; 902/2; 902/23; 902/40

(58) Field of Classification Search .............. 463/16–23, 463/25–33, 39–43; 273/138.1, 139, 138.2, 273/141 A, 454–456, 460; 705/56–57, 64, 705/67, 72, 74–75, 78–79; 709/203–207, 709/FOR. 113; 713/1, 100, 150, 155, 170, 713/176, 182–184, 186–189, 300, 375, 400, 713/500, 600; 902/2–3, 23, 38, 40
See application file for complete search history.

(56) References Cited

U.S. PATENT DOCUMENTS 5,697,844 A 12/1997 Von Kohorn
(Continued)

FOREIGN PATENT DOCUMENTS

WO WO-2004084444 A1 9/2004

OTHER PUBLICATIONS

International Search Report in PCT Application Serial No. PCT/US07/077382 dated Apr. 15, 2008, 4 pages.

(Continued)

*Primary Examiner* — Arthur O. Hall
(74) *Attorney, Agent, or Firm* — Patton Boggs LLP

(57) ABSTRACT

The Gaming System With End User Feedback enables a reverse path feedback architecture wherein the forward path multicasted gaming content transmitted by a gaming site can be dynamically modified as a result of end user interaction or feedback, wherein each end user has a private bidirectional link to the gaming site to enter their moves, optionally receive private data from the gaming site to enable the end user's device to display private data that is hidden from the other players, and to communicate privately with another member or members of a sub-group.

30 Claims, 12 Drawing Sheets

U.S. PATENT DOCUMENTS

| | | | | |
|---|---|---|---|---|
| 6,036,601 | A * | 3/2000 | Heckel | 463/42 |
| 6,447,396 | B1 | 9/2002 | Galyean, III et al. | |
| 6,508,706 | B2 * | 1/2003 | Sitrick et al. | 463/1 |
| 6,594,498 | B1 * | 7/2003 | McKenna et al. | 455/517 |
| 6,681,115 | B1 * | 1/2004 | McKenna et al. | 455/517 |
| 6,954,641 | B2 | 10/2005 | McKenna et al. | |
| 7,169,052 | B2 * | 1/2007 | Beaulieu et al. | 463/43 |
| 7,480,727 | B2 | 1/2009 | Domschitz | |
| 7,546,118 | B2 | 6/2009 | Camp, Jr. | |
| 7,874,919 | B2 * | 1/2011 | Paulsen et al. | 463/39 |
| 7,881,944 | B2 * | 2/2011 | Heller et al. | 705/1.1 |
| 2002/0034980 | A1 | 3/2002 | Lemmons et al. | |
| 2002/0143901 | A1 | 10/2002 | Lupo et al. | |
| 2003/0018970 | A1 | 1/2003 | McKenna | |
| 2003/0163482 | A1 * | 8/2003 | Bunney et al. | 707/104.1 |
| 2003/0208613 | A1 | 11/2003 | Signes et al. | |
| 2004/0002049 | A1 * | 1/2004 | Beavers et al. | 434/350 |
| 2004/0031052 | A1 | 2/2004 | Wannamaker et al. | |
| 2005/0010653 | A1 | 1/2005 | McCanne | |
| 2005/0027648 | A1 | 2/2005 | Knowles et al. | |
| 2005/0039210 | A1 | 2/2005 | Dusenberry et al. | |
| 2006/0080360 | A1 | 4/2006 | Young et al. | |
| 2006/0099981 | A1 | 5/2006 | McKenna et al. | |
| 2006/0184977 | A1 * | 8/2006 | Mueller et al. | 725/86 |
| 2006/0248013 | A1 | 11/2006 | Ebert et al. | |
| 2006/0253601 | A1 | 11/2006 | Vedantham et al. | |
| 2006/0259469 | A1 | 11/2006 | Chiu | |
| 2007/0113179 | A1 | 5/2007 | Gibbs et al. | |
| 2007/0168490 | A1 * | 7/2007 | Kent et al. | 709/223 |
| 2007/0174887 | A1 | 7/2007 | Hu et al. | |

OTHER PUBLICATIONS

International Search Report in PCT Application Serial No. PCT/US07/077395 dated Sep. 17, 2008, 4 pages.

International Search Report in PCT Application Serial No. PCT/US07/077405 dated Apr. 23, 2008, 4 pages.

International Search Report in PCT Application Serial No. PCT/US07/077409 dated Apr. 18, 2008, 4 pages.

International Search Report in PCT Application Serial No. PCT/US07/077417 dated Apr. 1, 2008, 3 pages.

International Search Report in PCT Application Serial No. PCT/US07/077421 dated Mar. 14, 2008, 4 pages.

International Search Report in PCT Application Serial No. PCT/US07/077425 dated Mar. 17, 2008, 4 pages.

* cited by examiner

GAMING SYSTEM WITH END USER FEEDBACK FOR A COMMUNICATION NETWORK HAVING A MULTI-MEDIA MANAGEMENT

CROSS-REFERENCES TO RELATED APPLICATIONS

This application is a national stage of PCT Patent Application No. PCT/US07/077405 filed Aug. 31, 2007, and is hereby incorporated by reference to the same extent as though fully disclosed herein. This application also is related to applications titled “Transaction Management System In A Multicast Or Broadcast Wireless Communication Network” filed concurrently herewith; “Forward Path Multi-Media Management System With End User Feedback To Central Content Sources” filed concurrently herewith; “Forward Path Multi-Media Management System With End User Feedback To Distributed Content Sources” filed concurrently herewith; “Communication Network For A Multi-Media Management System With End User Feedback” filed concurrently herewith; “Gaming Device For Multi-Player Games” filed concurrently herewith; and “Virtual Aggregation Processor For Incorporating Reverse Path Feedback Into Content Delivered On A Forward Path”, filed concurrently herewith.

FIELD OF THE INVENTION

This invention relates to a Gaming System With Reverse Path Feedback which enables user feedback via the reverse path (end user device to network direction) from a plurality of end users whose actions change the delivered forward path content (network to end user device direction) being delivered via a wireless multicast communication network in a gaming application, with each user also receiving private data via a forward path associated with the reverse path.

BACKGROUND OF THE INVENTION

Current mobile multi-player games require a communication network consisting of a single bidirectional wireless air interface channel per player, all operating concurrently, thereby creating an environment of inefficient bandwidth utilization. Essentially, multi-player games are played on a massive wireless “conference call”. This architecture consumes wireless network resources and is a costly implementation of multi-player gaming in a wireless environment.

A feature of multicast service in a wireless communication network is that multiple end users share a single wireless air interface channel, logical or physical, which extends from the base station radio transmitter in the wireless communication network to their wireless end user devices, which single wireless air interface channel comprises the forward path that carries the multicast multi-media content. A plurality of end user devices thereby concurrently receives the multi-media content on the same channel. However, this delivered multi-media content, information, or data (collectively termed “content” or “multi-media content” herein) is static and is simply a replica of the source content, less any transmission or coding errors. The wirelessly multicast source content is immutable and does not have end user interaction or feedback.

New wireless multi-media content delivery architectures, such as MediaFLO (“Media ForwardLinkOnly”) and DVB-H (Digital Video Broadcast-Handheld), function by using a broadcast architecture in the forward path to produce a pseudo-multicast delivery and concurrently disseminate multi-media content to a plurality of wireless end user devices on a single air interface channel. In these architectures (also termed “multicast” herein), a unidirectional multi-media wireless broadcast network transmits multi-media content to selected authorized wireless end user devices in a time concurrent fashion. However, there is no interconnection, interaction, or feedback between the end users and their associated end user devices with this multicasted multi-media content stream. The forward path content is completely and totally static in its nature. The delivered multi-media content is essentially no different than UHF or VHF broadcasted television, other than it can be received on small portable digital devices.

The MediaFLO and DVB-H multi-media wireless architectures, therefore, are static in their user interface, since there is no interactivity or feedback between delivered multi-media content and the end user. The multicasted content is invariant or immutable in its extent. That is, whatever is delivered to the wireless network for transmission to the end user population is delivered as an exact replica, untouched and unmodified from its original form. This is a distinct and inherent limitation of the present wireless multicasting art (even though multicasting is efficient and targeted).

The present wireless multicasting art does not enable or permit end users, via their associated end user devices, to modify the multi-media content carried on the forward path in any manner. Still, there are numerous applications wherein the ability to modify the forward path multicast content based on end user (subscriber) input or actions would be highly desired. An example of such an application is multi-player gaming, where a plurality of participants is concurrently active in a gaming environment. Each player needs to have the ability to receive content indicative of the accumulated moves of the players while also having the ability to transmit private communications to the gaming site and receive private communications from the gaming site. For example, in a card game environment such as blackjack, all players concurrently view the “face-up” played cards of all the players, while each player receives a private display of their “face-down cards” and must have an ability to transmit confidential instructions to the gaming site regarding their next move and/or wager. Many of the present massive multi-player role-playing games (MMORPG) enable players to form sub-groups, tribes, or armies; as a result, there is a need for members of a particular sub-group to communicate with each other, form alliances, or make moves together, but not necessarily with all the players of the game, and to communicate the collaborative decision back to the game host. There is presently no system in the wireless multicasting technology that can provide this capability. What is needed is a novel adaptation of a wireless multicast network that enables end user interaction and modification of the forward path delivered multimedia content.

Thus, the state of the wireless multicasting art does not enable the capability to dynamically modify the content delivered on the forward path via aggregated feedback or input from at least one of a plurality of end users via their associated end user devices while concurrently providing private two-way communications to each end user device. No system heretofore has envisioned engaging the end user to directly and actively influence the delivered multicasted content.

BRIEF SUMMARY OF THE INVENTION

An advance is realized over the present wireless multicasting art with the present Gaming System With End User Feedback For A Communication Network Having Multi-Media Management (termed "Gaming System With End User Feedback" herein), which enables a reverse path feedback architecture wherein the forward path multicasted gaming content transmitted by a gaming site to a plurality of end users can be dynamically modified as a result of end user interaction or feedback, wherein each end user has a private bidirectional link to the gaming site to enter their moves, optionally receive private data from the gaming site to enable the end user's device to display private data that is hidden from the other players, and to communicate privately with another member or members of a sub-group.

In this Gaming System With End User Feedback architecture, end user devices share a common wireless forward path of a multicast communication architecture in which the forward path delivered gaming content is dynamically changed or modified based on a real-time, near-real-time, or delay-time basis via aggregated reverse path feedback from a plurality of end user devices. The Gaming System With End User Feedback periodically or continuously aggregates the feedback input received via the reverse paths (having wired and/or wireless connectivity) that connect all of the end users to the gaming site, modifies the forward path multi-media content, and delivers this dynamically modified multi-media content to the then connected population of end user devices via a wireless forward path multicast in a repetitive closed loop fashion.

The Gaming System With End User Feedback aggregates the reverse path feedback from the end user devices and then processes this feedback data in context with the streamed forward path content generated by the gaming site. For example, if the application is a multi-player game, the Gaming System With End User Feedback receives the end user's reverse path feedback data which defines how their avatar or in-game virtual person should react or behave at a given point within the game. This feedback is sent to the Gaming System With End User Feedback via wired or wireless means. The Gaming System With End User Feedback aggregates the "combined feedback" of all the connected end users for that moment in time and delivers the aggregated feedback to the gaming software application. The aggregation of the end user feedback may be implemented on the communication network, in stand-alone hardware, or it may be hardware or software incorporated within the game, or content source, itself. The gaming software application then modifies its streamed forward path content according to the latest "combined feedback". The wireless multicast network then delivers the latest video frames or sequence of successive game image frames of the game session (to include sound) to the participating end users based on the "combined feedback". This process repeats in a continuous fashion, with continuous N+1 events of "combined feedback" delivered to the software application, which in turn modifies the streamed forward path content. The "combined feedback" may originate from any combination of participating end users, including any sub-group, team, or any combination of allied individual users.

In the Gaming System With End User Feedback architecture, the reverse path (end user to network direction) can be wired or wireless. Thus, the reverse path has flexibility in terms of its connectivity as well as the relative speed of its connection. For instance, a computer connected to a home or office LAN can use its personal LAN network for reverse path connectivity to the Gaming System With End User Feedback. However, to realize the forward path efficiencies of concurrent delivery of the streamed content, the computer also has the ability to wirelessly receive the concurrent forward path for its sub-population geographic grouping via cellular, WiFi, WiMax, MediaFLO, DVB-H, or some other wireless means. Alternatively, if the reverse path is wireless only, the end user device could use the same network as the forward path stream, such as in a WiFi or WiMax network; or it could be a hybrid of WiFi or cellular in the reverse path and MediaFLO in the forward path. Thus, the Gaming System With End User Feedback architecture is not limited to any one configuration.

The Gaming System With End User Feedback solves a complex problem resident in existing telecommunication architectures by combining reverse path feedback with forward path multicasting in numerous novel ways.

DETAILED DESCRIPTION OF THE INVENTION

Philosophy of the Multicast Wireless Communication System

An exemplary narrowcast technology is described in detail in U.S. Pat. No. 6,594,498 and U.S. Pat. No. 6,681,115, for example, and this technology can be used to implement narrowcast communications to wireless end user devices where the narrowcast is a highly targeted "multicast" to geographic and/or demographic end user groupings. The term "narrowcast" as used in these patents is considered a form of multicasting.

Gaming System with End User Feedback—Philosophy

Figure 1:
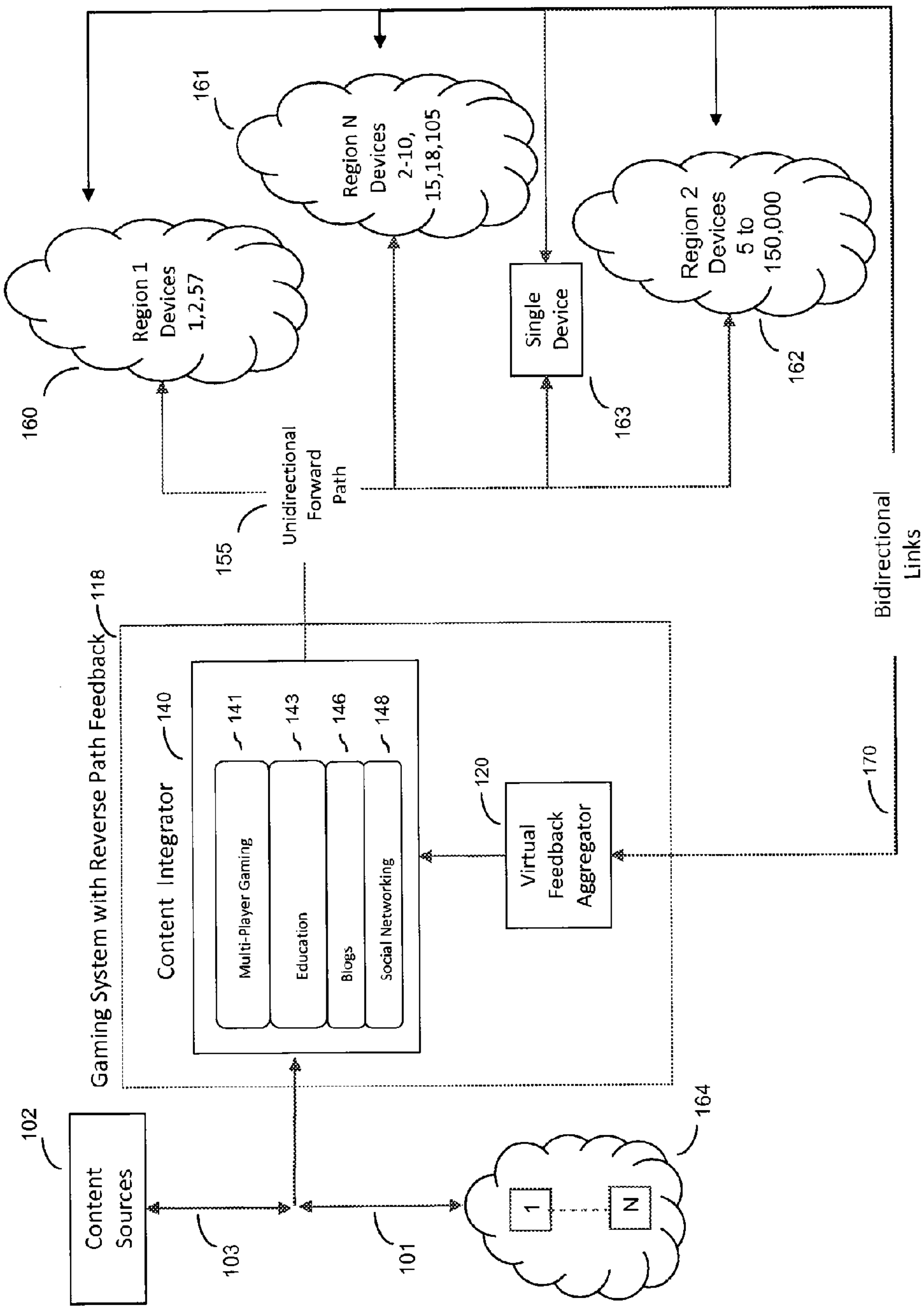
FIG. 1 illustrates, in block diagram form, the overall architecture of a typical Gaming System With End User Feedback.

The overall architecture of the Gaming System With End User Feedback is described in FIG. 1. In FIG. 1, end user devices, 1-N, potentially have source content 101 which is typically unique to each end user device. In addition, a common source of content 102 can be used to provide source content 103 that is transmitted via an unidirectional forward path 155 to the end user devices located in the various regions 160-162, as well as individual end user devices 163. The content first is delivered to the Gaming System With End User Feedback 118 where it is processed and then distributed to the selected groups of end user devices in each of the regions 160-162 and to individual end user devices 163. The Gaming System With End User Feedback 118 can also receive feedback from the end user devices via a reverse path of the bidirectional link 170, which feedback is associated with the content that is being transmitted to those end user devices. This feedback is used to modify the content that is received from the corresponding content source to create end user modified content which is then transmitted to the end user devices, as is described in greater detail below.

Thus, content is received from a content source, typically as a sequence of frames of data, which are transmitted to the end user devices which are selected to concurrently receive the sequence of frames of data. As ones of these selected end user devices transmit feedback to the Gaming System With End User Feedback 118, the feedback is collected by the Virtual Feedback Aggregator 120 and then used by the Content Integrator 140 to modify the content in the next (or presently) received frame from the content source to create end user modified content for transmission to the selected end user devices.

Communication Network Architecture

Figure 3:
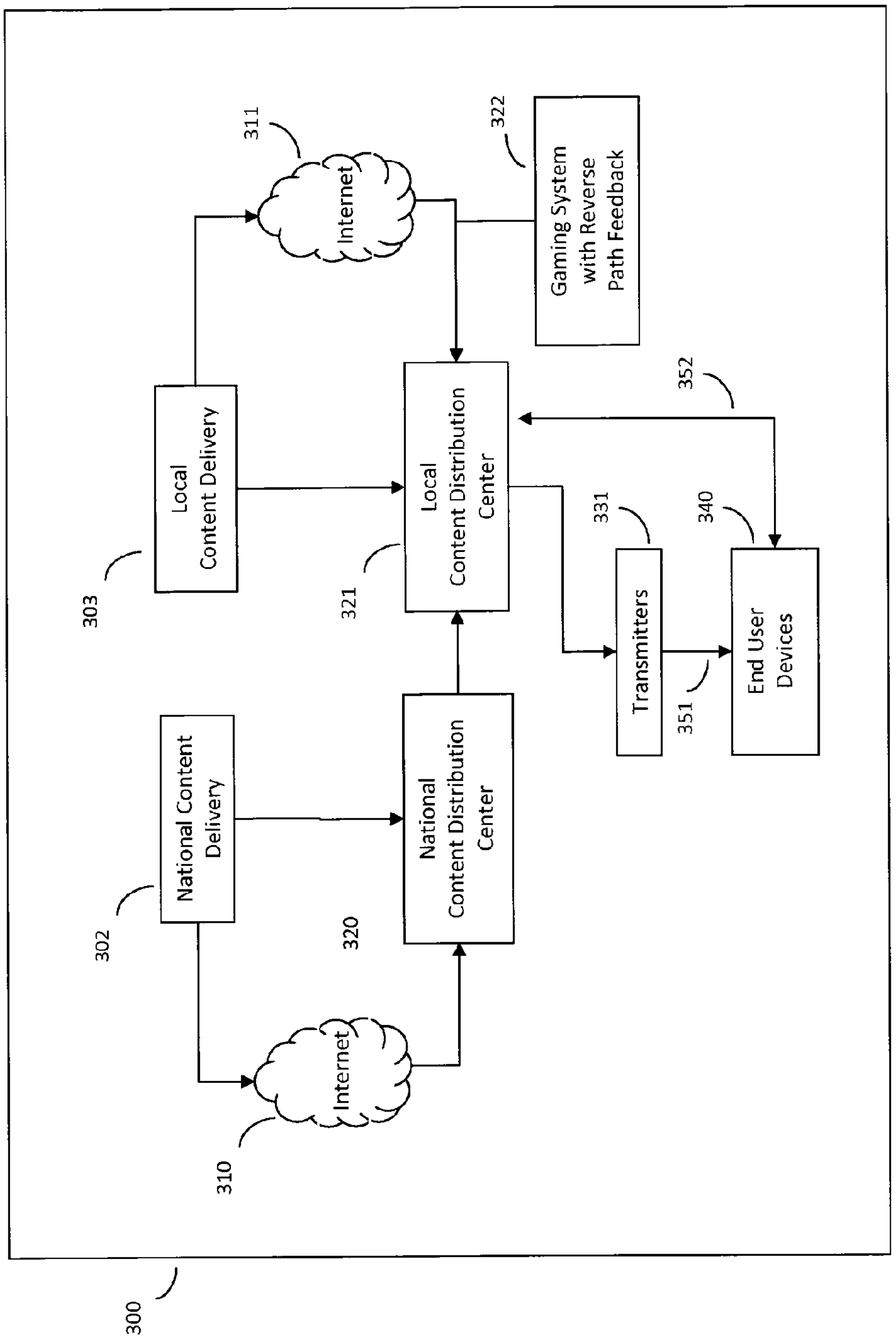
FIG. 3 illustrates, in block diagram form, a typical wireless communication network architecture in which the present Gaming System With End User Feedback can be implemented.

FIG. 3 illustrates, in block diagram form, a typical wireless communication network architecture in which the present Gaming System With End User Feedback can be implemented. This network 300 comprises a wireless multicast network using an unidirectional high bandwidth forward path 351 to transmit content to selected groups of end users (such as end user 340) as well as bidirectional links 352 which connect the end user devices 340 with a content distribution site 321. The content can be generated by end user devices as noted above, or can be obtained from various sources, such as national content provider 301, 302; local content provider 303, 304, which typically use various communication media, such as Internet 310, 311, to deliver content to national content distribution center 320; and local content distribution center 321 for forwarding to transmitters 331, 332, which wirelessly broadcast the content via unidirectional forward path 351 to the selected end user devices 340.

In this architecture, the selected end user devices have two communication links with the local distribution center 321: the unidirectional forward path 351, which is a broadcast format transmission, and the bidirectional link 352, which has a reverse path component for transmitting end user feedback from the selected end user devices to the local content distribution center 321, as well as a forward path component for transmitting end user private data from the local content distribution center 321 to an individual end user device. Thus, each end user device can communicate private information to and from the local content distribution center 321 via the reverse path and forward path components, respectively, of the bidirectional link 352.

The Gaming System With End User Feedback 322 can be located at various sites within this network 300 and, for the sake of illustration, is shown as being connected to the local content distribution center 321. Since many of the massive multi-player role-playing games are national or even international in scope, the site of the Gaming System With End User Feedback 322 is more a choice among a number of variables including, but not limited to: available network bandwidth, base location of the company hosting the massive multi-player role-playing game, and the like. The Gaming System With End User Feedback 322 can also be located within the local content distribution center 321 or the national content distribution center 320 as a matter of choice. The communications between the local content distribution center 321 and the Gaming System With End User Feedback 322 in this example carry the content to the Gaming System With End User Feedback 322 from the various content sources, such as content sources 302, 303. In addition, content and modified content from the Gaming System With End User Feedback 322 to the end user devices is carried over the forward path 352, and feedback from the end user devices to the Gaming System With End User Feedback 322 is carried over the bidirectional links 352, as is the private data from the Gaming System With End User Feedback 322 to the end user devices. Thus, the local content distribution center 321 is an intermediate data transmission element interposed between the Gaming System With End User Feedback 322 and the end user devices.

Selection of End User Devices for a Group

End user devices can be grouped by region, locale, or geography as sub-populations in the various regions 160-162 served by the wireless communication network. In aggregate, all of the sub-populations form the "population" of end users. It's also possible to have just a single device 108 connected to the Gaming System With End User Feedback, either as a physical location or as a logical member of a sub-population or population. All of the end user devices, whether singly or as some type of grouping, communicate on the reverse path component, in a wired or wireless fashion, of the bidirectional link 352, to Gaming System With End User Feedback 322 where all of the reverse path content is aggregated and processed, where the processing steps are likely application dependent. The Gaming System With End User Feedback 322 modifies the forward path content based on the collective reverse path feedback. The selection of authorized end user devices is done in conjunction with the end user device registration process described below.

Gaming System with End User Feedback

At Gaming System With End User Feedback 118 on FIG. 1, a number of applications are possible in addition to gaming, and the listed applications in no manner suggest that this is the entire set of applications that the Gaming System With End User Feedback 118 is capable of implementing. Multi-player application 141 is a gaming process that implements multi-player gaming, gambling, or live multi-party interactive competitions. Education application 143 represents an education application where a student or students can ask professors questions of a live multicasted classroom lecture. Blogging application 146 provides the end users with a venue to post blogs. Social networking application 148 represents any multi-party communication site. Collectively, these multi-party interactive applications are termed "gaming" herein, which term is not intended to limit the nature of the content being distributed or the types of interactions among players and the Gaming System With End User Feedback 118, but is more indicative of the similar nature of the types of inter-party interactions that are supported.

Figure 4:
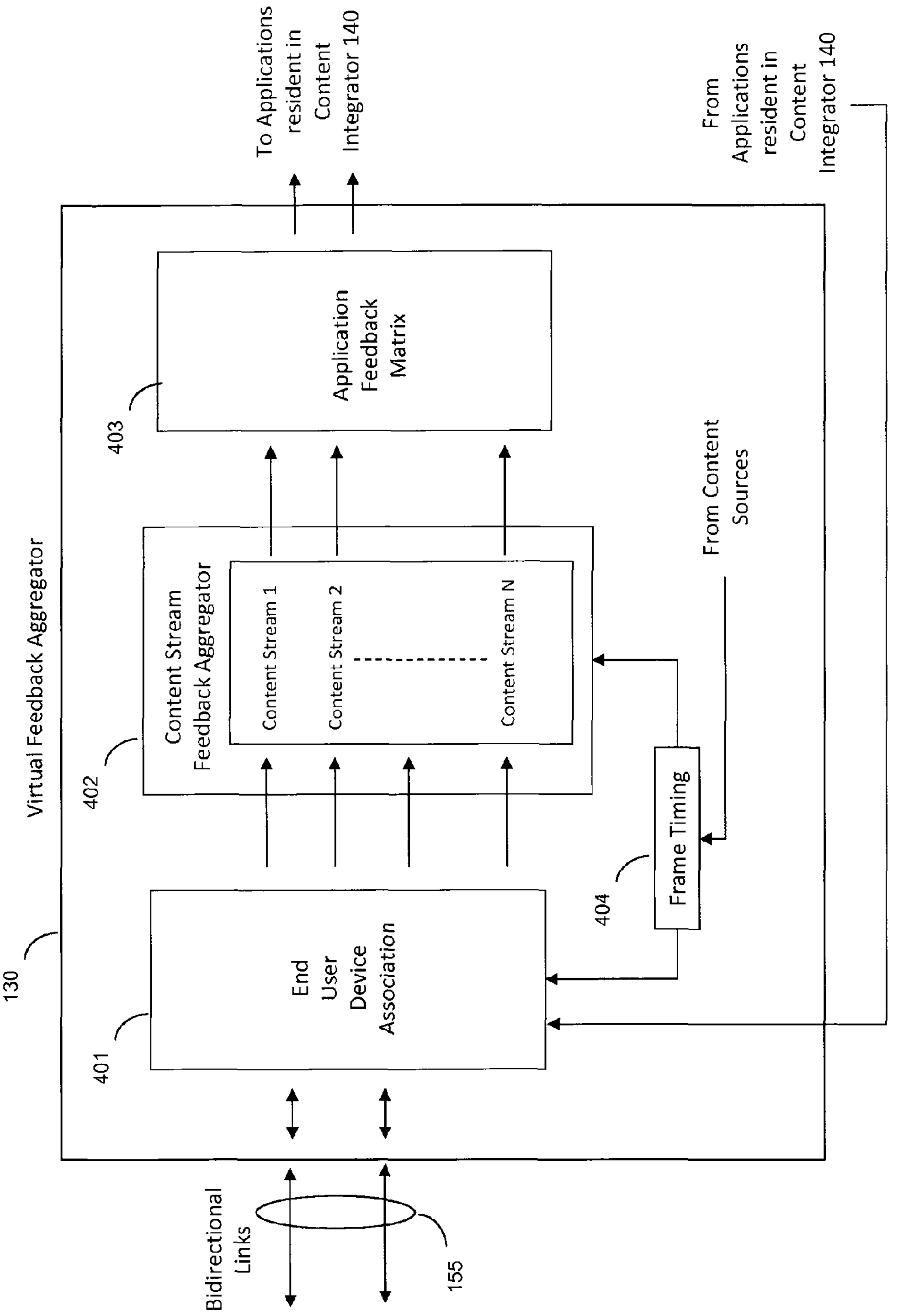
FIG. 4 illustrates, in block diagram form, additional details of the Gaming System With End User Feedback.

The Gaming System With End User Feedback 118, as shown in additional detail in FIG. 4, includes a Virtual Feedback Aggregator 120 which receives the feedback from the selected end user devices that are presently receiving the gaming content from a selected gaming content source. This feedback must be synchronized with the content that is being received from the content sources so that frames are changed in synchronization with all of the end user devices. Thus, an End User Device Association Module 401 manages the association of a particular end user device with the content stream that the end user device is presently receiving to ensure that the feedback is applied to the correct content. Since the gaming content typically comprises a series of frames that are delivered in sequence to the plurality of end user devices, a "past frame" (as the term is used herein) is the frame last delivered to the plurality of end user devices and a "present frame" (as the term is used herein) is a frame received from the gaming content source but not yet delivered to the plurality of end user devices. A Frame Timing Module 404 defines a time period for use by the End User Device Association Module 401 during which time period the input received from the plurality of end users is associated with the present frame received from the associated content source. The feedback input received is stored in the Content Stream Feedback Aggregator 402 on a per content stream basis, with each content stream having the associated feedback collected independent of the operation of the remaining content streams, since the timing among content streams may not be synchronous. At the end of a frame timing interval, the Content Stream Feedback Aggregator Module 402 outputs the collected feedback input to an Application Feedback Matrix 403, which switches this data to the appropriate application resident in the Content Integrator 140 or resident at a different location in the network.

The Content Integrator 140 generates a modified gaming content from the frames received from the selected gaming content source and the feedback input received from the Application Feedback Matrix 403. For example, Multi-Player Gaming Application 141 receives the moves, wagers, and the like from the various players engaged in a multi-player game and modifies the image contained in the present frame to display the latest end user modified content. The Content Integrator 140 transmits the modified frame of gaming content to the communication network for transmission over the unidirectional forward broadcast paths 155 to the plurality of end user devices that are presently receiving the gaming content from the selected gaming content source.

Thus, the output of the various services and applications are transmitted via communication path 155 to effect a multicast of the modified content which is received from the content source via the forward path 155. Note that forward path 155 can take on many forms, ranging from cellular to MediaFLO to WiMax, and this listing does not limit the inclusion of other means which realizes a forward path delivery mode. Forward path 155 connects to end user groupings 160, 161, 163, and to end user device 162. As an example, grouping 160 contains end user devices 1, 2, and 57, which are unique to Region 1; the forward path to this grouping could be via MediaFLO, for example. End user grouping 161 in Region N includes end user devices 2-10 and 15, 18, and 105, which might be connected via forward path 155 as a WiFi architecture. In Region 2, the listed end user devices could be connected via forward path 155 as a DVB-H signal. The Single Device 162 may be in a very remote area, so it uses a mobile satellite means to receive forward path 155.

Gaming Representative Architecture

Figure 2:
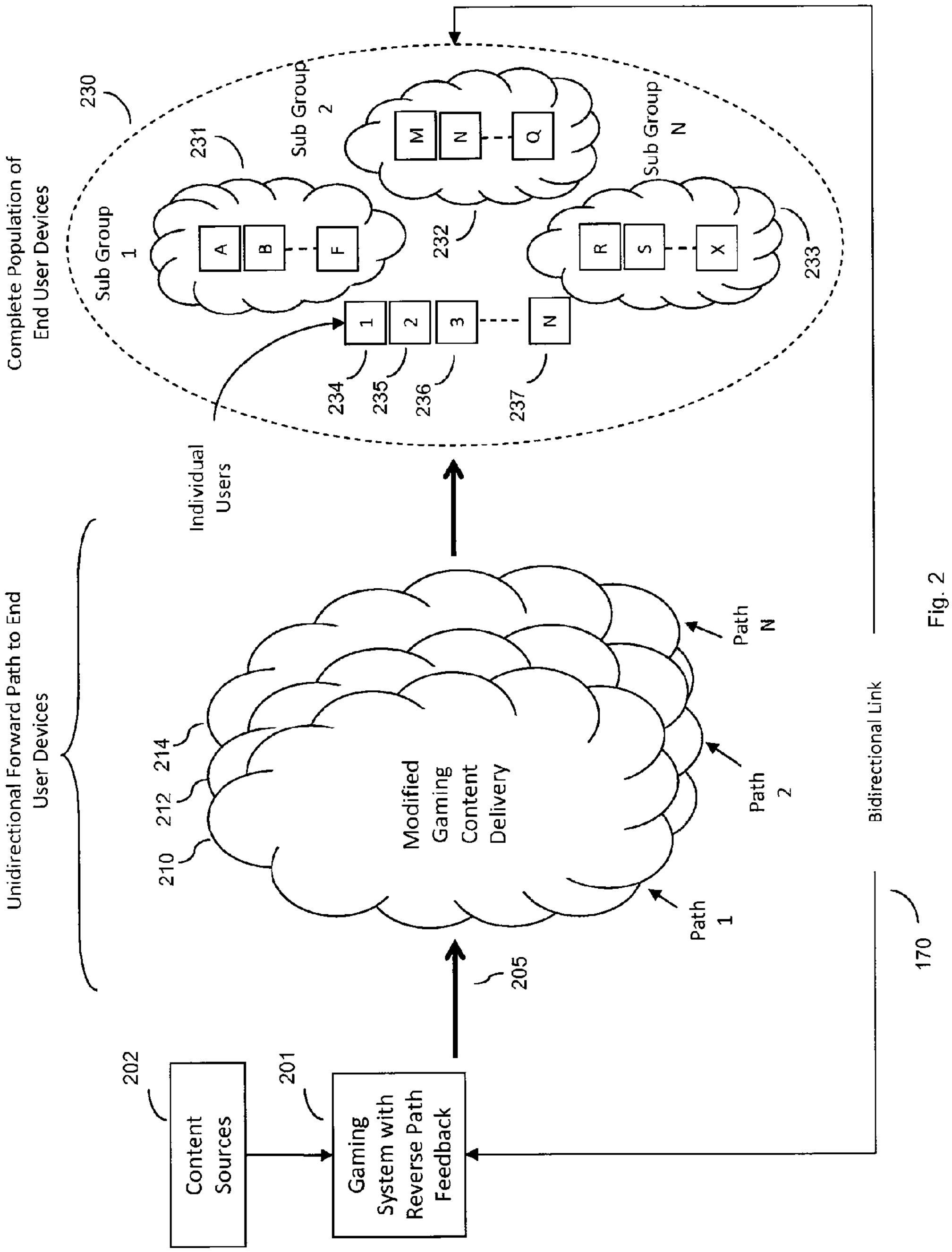
FIG. 2 illustrates the inter-relationship between a series of forward path multicasts and sub-populations of end users with reverse path feedback.

FIG. 2 illustrates, in broad perspective functional block diagram form, how a typical gaming application might be architected in a network that spans a large end user population. For this example description, the card game of blackjack gambling is used; however, nothing in this example description limits the applicability of the described concepts to other applications with similar attributes.

At Gaming System With End User Feedback 201, the reverse path feedback data is aggregated from the reverse path 240. The data coming into Gaming System With End User Feedback 201 originates from end user devices. This feedback data could be instructions such as: "I'll take another card", "I want to double down", "I fold and am out for this game only", or "I am done playing entirely". For blackjack, the "dealer" is a software application which can be multi-player gaming application 141 resident in Gaming System With End User Feedback 201 or an application residing as an external network connected device (not shown). This multi-player gaming application 141 responds to data collected by Gaming System With End User Feedback 201 and then creates and provides modified content via connection 205 to forward paths 210, 212, and 214.

Nothing herein limits what form forward paths 210, 212, and 214 take. Thus, forward path 210 could be WiFi, forward path 212 could be MediaFLO, and forward path 214 could be cellular, each of which comprise an air interface for the forward path. Forward paths 210, 212, and 214 can also be characterized as a physical delivery region or can be characterized as a combined physical and logical delivery region/method, respectively, or just a logical delivery method. If forward paths 210, 212, and 214 are logical delivery paths, then the delivery methodology is related to pairing of end users with a given forward path's content, where the end users have like interests independent of physical location. The actual physical delivery regions of these forward paths could be highly varied and diverse. For example, forward path 210 may just be a single narrowcast to a neighborhood in a city on a Caribbean island where electronic gambling is legal. In contrast, forward path 212 could be to all the major gambling areas in the world to include, but not be limited to: Las Vegas, Atlantic City, river boats on the Mississippi, cruise ships on the ocean, casinos on tribal lands, the French Riviera, Monaco, and so on. For forward path 212, since it is covering so many diverse geographic regions, the air interface of the forward path can vary, be it WiFi, DVB-H, or MediaFLO; and nothing herein limits what method is used to deliver the reverse path modified content on the forward path. Finally, forward path 214 might be to all college campuses in the state of Nevada that have more than 2000 students.

The modified forward path content is sent via connection 220 which, as already discussed, could take the form of a variety of wireless air interfaces. The complete set of Players or End Users 230 and their associated End User Devices is the connected Population. In aggregate, the entire Set or Population 230, in some pre-specified timeframe, provide feedback via connection 240, to Gaming System With End User Feedback 201, all in a continuous fashion until a given blackjack game is complete, when a new game is started, or when the scheduled time for blackjack is over, for example.

Reverse Packet Timing

Figure 5:
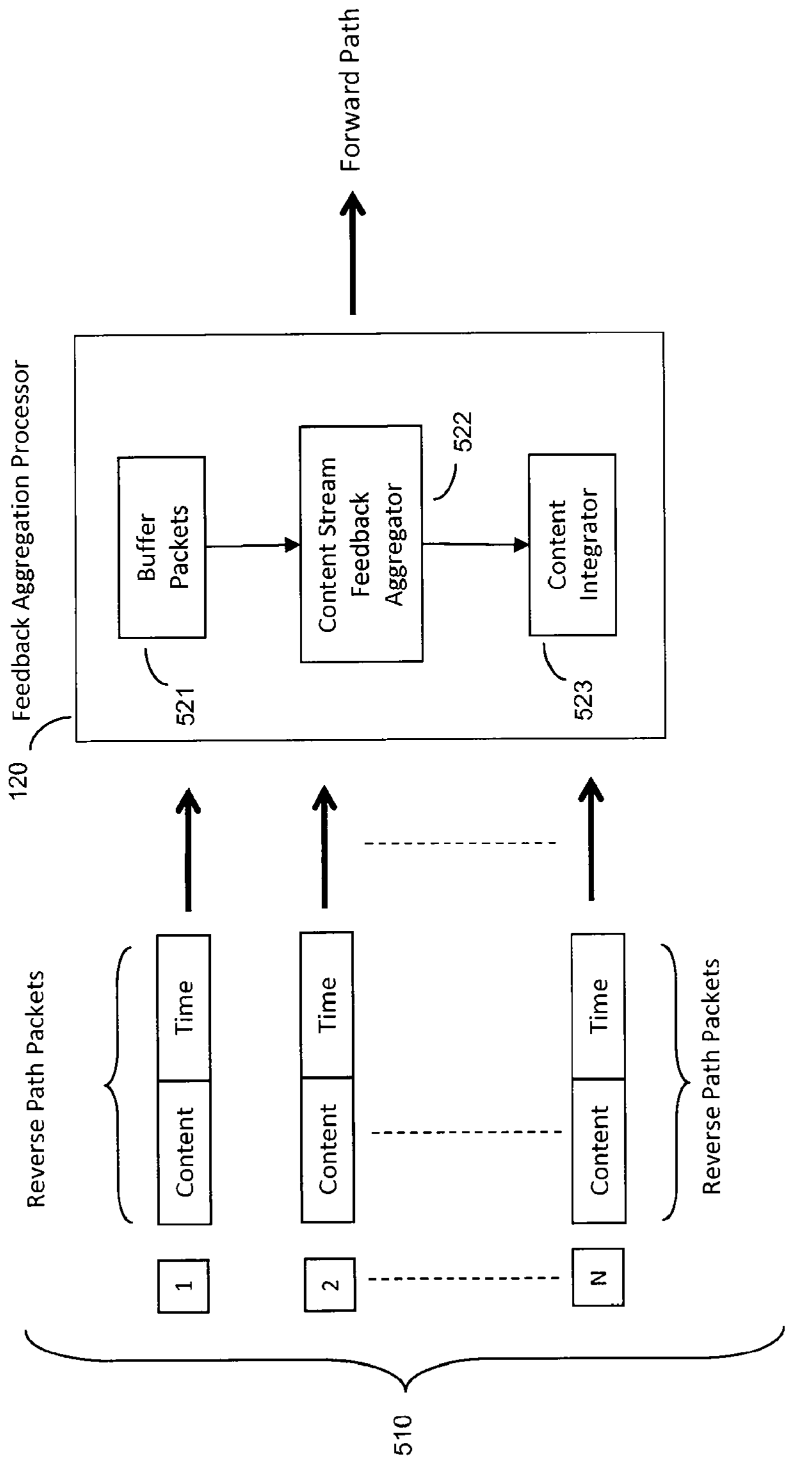
FIG. 5 illustrates, in block diagram form, the time alignment of reverse path data to insure forward path modification accuracy.

FIG. 5 illustrates, in block diagram form, the time alignment of reverse path data to insure forward path modification accuracy. In FIG. 5, for most applications, it is important to time align the reverse path packet set 510 comprising packet streams from end user devices 1-N. This is true for applications such as gaming, where the players' data needs to be aggregated, again within some time window as noted above; otherwise, the modified forward path content appears out of context or nonsensical. FIG. 5 illustrates the functional operation of the Gaming System With End User Feedback 501 to address the packet timing issue.

Gaming System With End User Feedback 501 includes a data buffer 521, which stores the received reverse path end user feedback packets until they can be time sequence ordered by a timing processor 522 (within some time window), and then forwarded to the delivery networks 523. Reverse path packets that arrive outside of the time window for aggregation would be discarded or delayed for use in the successive time interval, based on the operation of the multi-player gaming application 141. Thus, a blackjack player can wager only when it is their turn to wager and can play and receive cards only when it is their turn to play. If a player attempts to wager or play cards out of turn, their input will be discarded in order to maintain the integrity of the game.

Furthermore, when the player plays or receives cards, the displays must account for these changes. In the instance where the cards are played face up, the display transmitted via the unidirectional forward path to all the players is updated. In the case where face down cards are received by a player, the player must receive a display of their new cards, but the other players must not be able to see the face down cards. Thus, the forward path of the bidirectional link 170 can be used to transmit a display update to the player's associated end user device to show only the player their face down cards, such as in a split screen display. This private data can also be transmitted to the player via the unidirectional forward path 155 as an in-band encrypted data stream, which only the one player can decrypt using their personal decryption key. Thus, multiple private data transmissions can be included in the unidirectional forward path 155 transmission if they are time-interleaved and encrypted.

Process for Modifying the Forward Path

Figure 6:
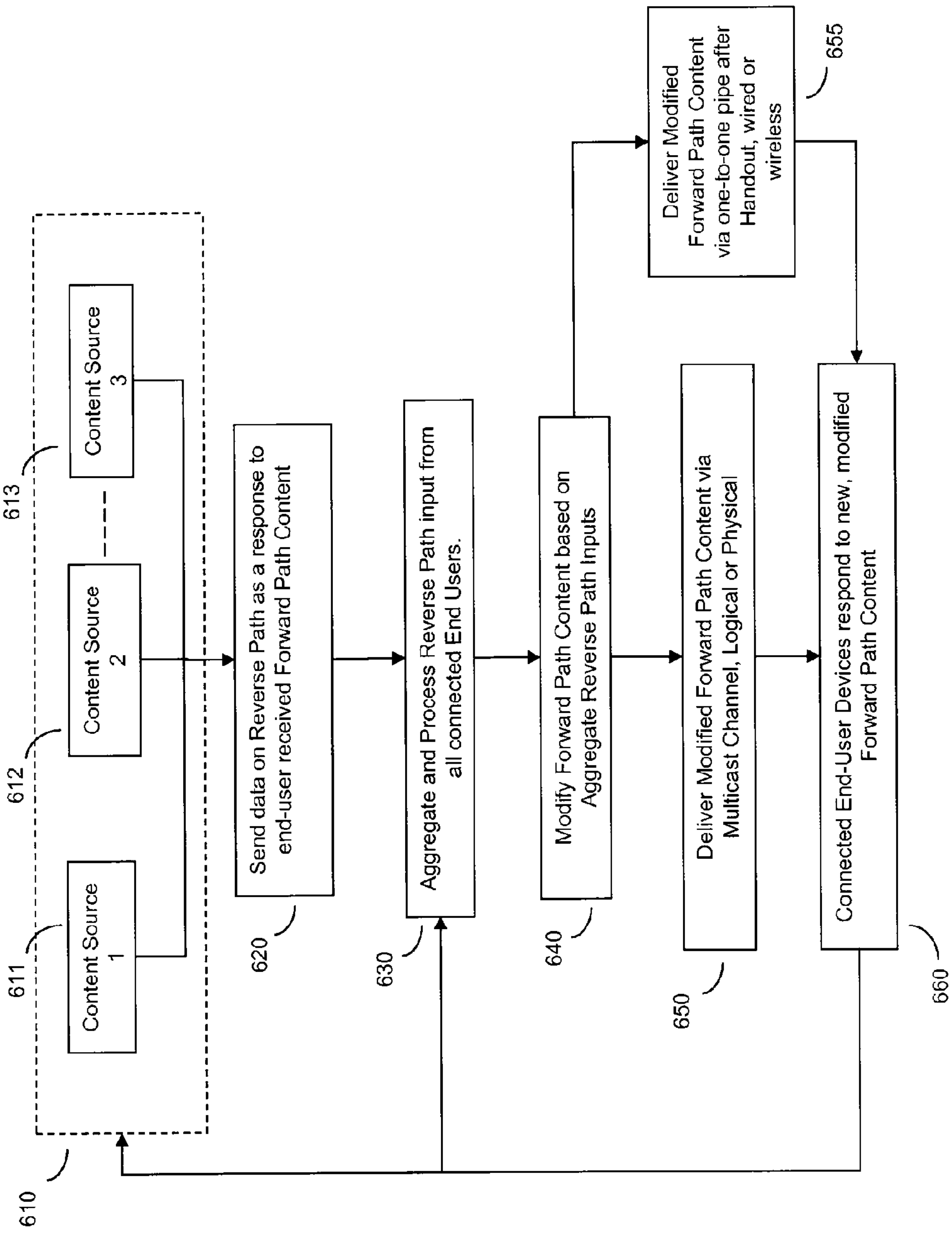
FIG. 6 illustrates, in flow diagram form, the macro process steps that the Gaming System With End User Feedback takes to complete a continuous forward path modification cycle.

In FIG. 6, a typical process for modifying the content that is transmitted on the forward path is described. This is merely one of a number of methods to modify the content that is transmitted on the forward path and is not meant to be the only means for such forward path modification.

At step 610, the entire population of then connected end user devices is shown. The Gaming System With End User Feedback is not limited to where the end user devices are physically located. End User Device 1 (611), along with End User Device 2 (612) and End User Device "N" (613), respond to the most recent forward path content, such as the display on a hand-held video game, and initiate a reverse path communication via their end user device at step 620, such as how to move their avatar in an action game. At step 630, the Gaming System With End User Feedback receives and processes the reverse path input from the then connected end user devices. Step 630 would also implement the steps of FIG. 5 to insure time coherency in the aggregated responses.

At step 640, the forward path content, still to be delivered back to the connected end user population, is modified. Thus, in this gaming application, the next frame (or number of frames) of the game is modified based on the collectively aggregated reverse path input. At step 650, the game video and audio is delivered via a shared forward path. The delivery can be via physical grouping, logical grouping, or a combination of the two forms of grouping. At step 655, the game video and audio is delivered via a one-to-one communication means, either wired or wireless.

At step 660, the feedback loop starts again where the end users via their end user devices begin to respond to the new video and audio being displayed on their end user devices. Step 660 connects to step 630 in a continuous fashion until the game is complete or some other decision for game termination is realized, such as a time or date. In addition, at step 670, the end user feedback can be destined for selected ones of the other players in the multi-player game so a player can team with other players in a personal end user device to end user device communication link over the bidirectional links.

Team Playing in a Massive Multi-Player Role-Playing Gaming Environment

Figure 12:
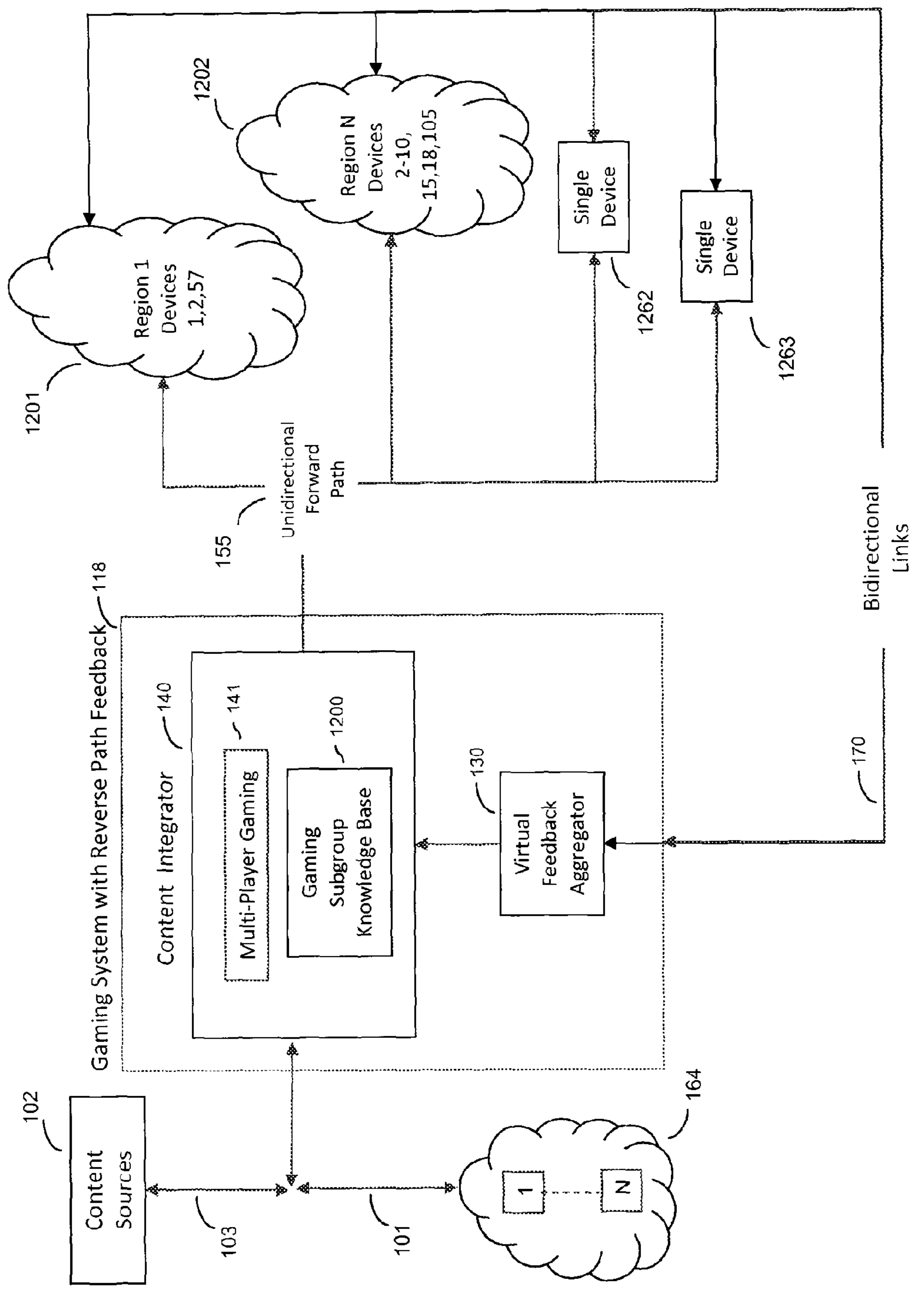
FIG. 12 illustrates, in block diagram form, the architecture of a typical network application for managing sub-group, or team, interaction in a mobile massive multi-player role-playing game (MMORPG).

FIG. 12 describes one method for managing sub-group, or team, interaction in a mobile massive multi-player role-playing game (MMORPG). At Gaming System With End User Feedback 118, the reverse path feedback data is aggregated from the reverse path component of the Bidirectional Link 170. The data coming into Gaming System With End User Feedback 118 originates from end user devices as shown in FIG. 12. To manage sub-group interaction, there would be a Gaming Sub-Group Knowledge Base 1200 within the Gaming System With End User Feedback 118 where feedback is aggregated from designated (by coding or other means) members of a particular sub-group or team. For example, a virtual city is under attack, as part of the larger game, and the "residents" of that city/sub-group 1201 need to vote on whether to access the magic reserves in order to defend the city. The vote would be aggregated in the Gaming System With End User Feedback 118, but only those players who are coded as members of the appropriate sub-group would be allowed to vote, as determined by the Gaming Sub-Group Knowledge Base 1200. The game would be changed based upon the outcome of that vote. The change to the game might be communicated to all players in the game via the Unidirectional Forward Path 155 or only to the members of the sub-group via the forward path of the Bidirectional Link 170. Another example is where two or more players 1262, 1263 in a massive multi-player role-playing game form an alliance and need to communicate privately. In this instance, the feedback, or communication, from each player in the alliance is aggregated from the reverse path component of the Bidirectional Link 170 in the Gaming System With End User Feedback 118 and further processed by the Gaming Sub-Group Knowledge Base 1200. This private communication data is disseminated to other members of the alliance on the forward path of the Bidirectional Link 170. The ability of massive multi-player role-playing games to accommodate sub-groups and alliances is well known in the art; and in some cases, data or feedback from the Bidirectional Link 170 may be processed at the Content Source 102.

Intra-Network Handovers

Figure 7:
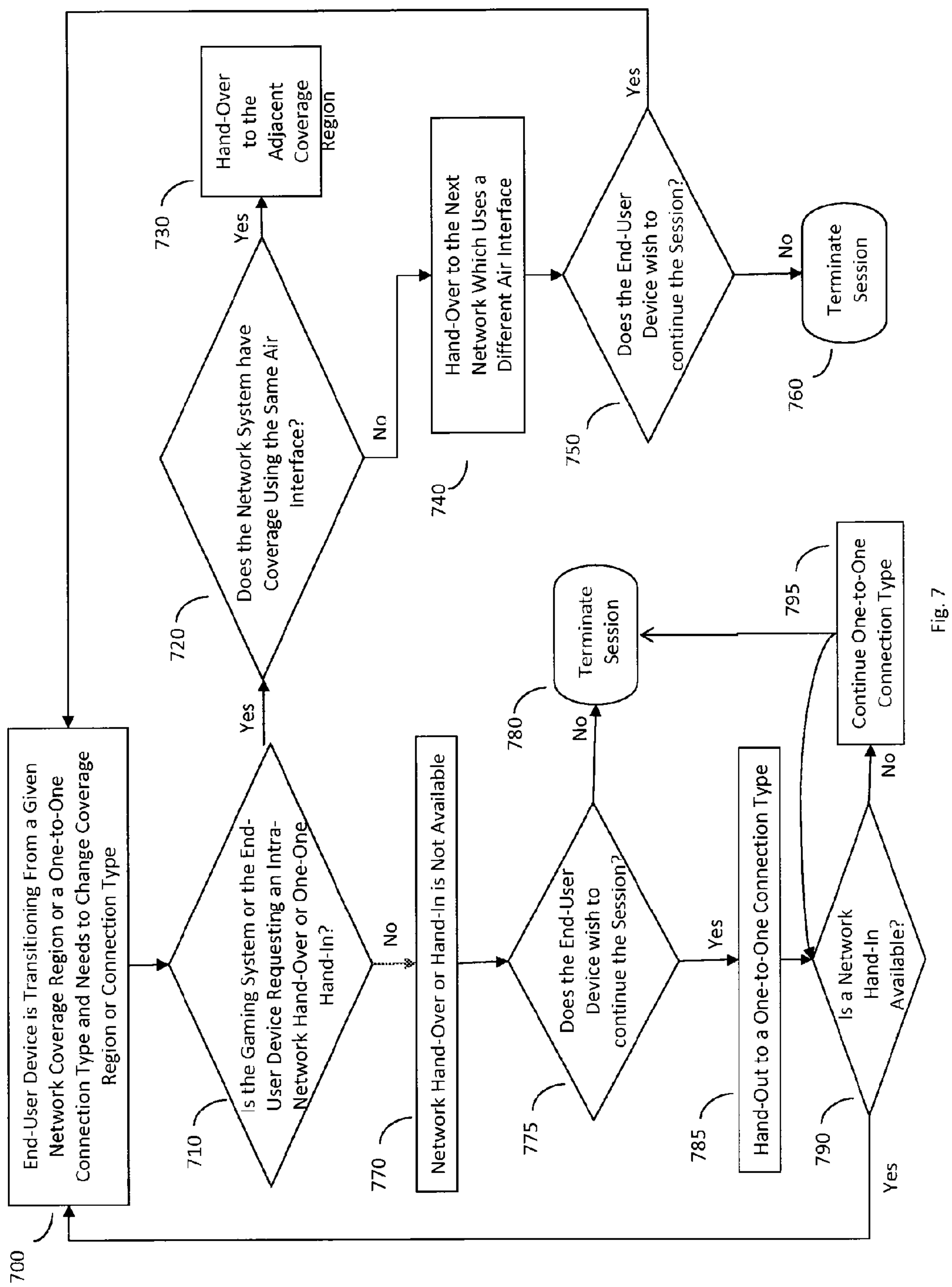
FIG. 7 illustrates, in flow diagram form, how an end user could hand-in or hand-out of a modified forward path multicast region.
Figure 8:
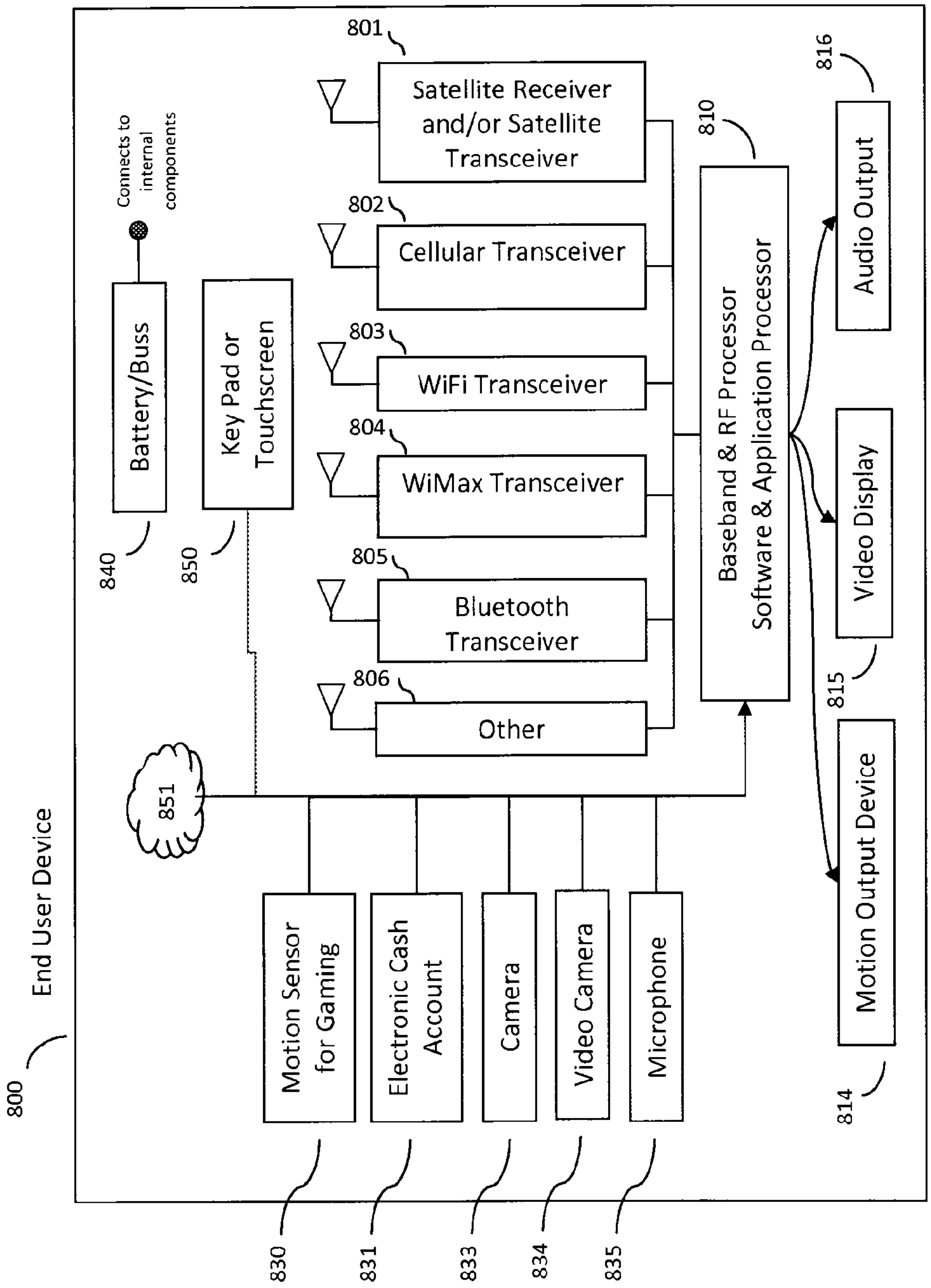
FIG. 8 illustrates, in block diagram form, a typical end user device.

FIG. 7 describes one method for managing intra-network handovers. The networks could be comprised of overlapping or adjacent multiple air interface architectures as shown in FIGS. 1, 2, and 8. Each of these architectures, whether it is MediaFLO, cellular, or satellite, has a shared forward path capability making it suitable for the Gaming System With End User Feedback. Often, it is desirable to find the fastest network, the least cost network, the most reliable network, the most available network, or some combination thereof, depending on the given application. In most locations, multiple network types are already deployed and readily available for Gaming System With End User Feedback use. As an example, a social network application could be advertising supported, but there is a bias or priority to least cost routing. In contrast, an emergency management system may have a priority of ultra-high availability and reliability. (Availability relates to network up-time, and modern networks often achieve 99.9% plus availability; reliability relates more to equipment failures. Reliability affects availability, although the two are not necessarily synonymous. For instance, a software failure affects availability even though the equipment hadn't failed.)

In FIG. 7, at step 700, an end user device is transitioning from a given network coverage region or a one-to-one connection type and needs to change coverage region or connection type. The following discussion first centers on an intra-network handover. At step 710, either the Gaming System With End User Feedback or the end user device itself recognizes that a hand-over is necessary. This is done through various means to include, but are not limited to: measurement of Radio Frequency signal strength, measurement of bit-error-rate (BER), measurement of frame-error-rate (FER), end user device measurements taken of an adjacent coverage region and then compared with the current coverage region, and so on. The Gaming System With End User Feedback, without end user device assistance, can direct a handover; the end user device can send a handover request to the system; or both the Gaming System With End User Feedback and the end user device can work together on some pre-determined algorithmic basis to request a handover.

Transitioning to step 720, it was determined that an intra-network handover was desired and was available. The word "intra" here means within the network; however, recall that the network could be multi-architecture as already described herein. Thus, at 720, a determination is made as to whether the end user device can handover to a new coverage region wherein said new coverage region is of the same air interface type. An example would be handing over from one MediaFLO coverage region to a second, adjacent MediaFLO coverage region. This is shown as step 730. This handover could be done in soft or softer hand-off algorithms; it could even be a hard hand-off (make then break or break then make). The system, using well-known methods in the art, would insure that no data is lost during the transition, so the transition would appear seamless to the end user.

However, if an adjacent MediaFLO coverage region is not available, then a different air interface in the network must be determined and selected, again through bit-error-rate (BER), measurement of frame-error-rate (FER), or the like means. So, for discussion purposes, let's say that the preferred adjacent coverage region for this example is based on a WiMax architecture. In this case, the end user device would transition from the MediaFLO coverage region to the WiMax coverage region. This is shown as step 740. Specially designed timing and data buffers would insure that the data stream received at the end user device would be received in an error-free and seamless manner. The intra-network handover is error-free or lossless in its extent and is completed in an inter-manner between two different air interfaces, albeit both air interfaces being a part of the aggregate network.

In either example, MediaFLO to MediaFLO handover or MediaFLO to WiMax handover, the typical process is to continue the session to step 700 in a repetitive or continuous fashion. This enables end user devices that are mobile or moving in nature to have seamless coverage regardless of which air interface they select.

At step 750, the Gaming System With End User Feedback or the end user device itself can make the decision to terminate the Gaming System With End User Feedback session or continue the session back to step 700. If the decision is to terminate the session, step 760 is executed.

Hand-Outs/Hand-Ins from/to the Network

Going back to step 710, if a handover is requested but there is no physically adjacent network coverage of any air interface type (step 770), in order to maintain the Gaming System With End User Feedback session, the end user device must transition to a one-to-one connection type where the forward path is no longer shared but is unique to the end user device. The advantage of this approach is that the Gaming System With End User Feedback session remains seamless in its operation but it is no longer using a shared forward path. The disadvantage is that the cost of maintaining the session is now no longer shared among large numbers of end users. The one-to-one connection type could be circuit switched, packet switched, or use the IP protocol or IPv6 protocol, for example.

At step 775, the end user can manually elect at that moment in time or pre-select whether or not they wish to pay the extra cost for a one-to-one connection type. If they have elected that the additional cost is not desired, the end user device (if it's pre-programmed) can terminate the session at 780.

If the decision is to transition to a one-to-one type of connection, then step 785 is executed as a hand-out from the present multicast network using a shared forward path to a unique one-to-one forward path. It is important to mention again that the hand-out is seamless without loss of data using means well known in the art. The Gaming System With End User Feedback merely continues to send or stream whatever content the end user was receiving as a shared forward path prior to the hand-out, only now it is a unique forward path. This unique forward path could be wired or wireless. For example, the end user drove out of a MediaFLO shared forward path coverage area and now transitions to a one-to-one cellular type of connection, which could be 3G because the application bandwidth is high.

In general, it is preferred to have the multicast forward path be shared for network efficiency and cost purposes. So, at step 790, the end user device is looking for a hand-in opportunity back to the multicast shared forward path architecture. Until the end user device determines that this is possible, the one-to-one connection continues in a repetitive fashion at step 795 unless the end user elects to terminate the session (shown as a dotted line between 795 and 780). If a network hand-in is possible, the process is returned to step 700.

Throughout all of the handover processes, the Gaming System With End User Feedback continues to receive aggregated reverse path content from the then connected end users with their associated end user devices. If the application running on the Gaming System With End User Feedback is a gaming application, for example, the shared forward path content remains being modified in a continuous fashion. If the end user device is connected in a one-to-one fashion, it would receive the same streamed content as those end users still using the shared forward path.

End User Device

FIG. 8 depicts a block diagram of one embodiment of an end user device. This particular embodiment of end user device 800 has multiple means to communicate as well as numerous means to provide input to ultimately modify the forward path. The description of this device is likely more encompassing than would be for a typical end user device. The description contained herein is meant to show what is possible.

End user device 800 is capable of receiving content multicasts, broadcasts, or narrowcasts on the forward path. End user device 800, either in an autonomous mode or via end user action, then is capable of communicating, in the reverse path direction, end user initiated content which could be complete in its nature or could be used (in aggregate) to modify the next few frames of a video game, for instance, after processing by the Gaming System With End User Feedback.

The central portion of end user device 800 is baseband and RF processor 810 which also contains an application processor with associated software/firmware. Baseband and RF processor 810 manages the operation of end user device 800 by collecting input from input devices 830-835 and 850, communicating via devices 801-806, and outputting content, information, and data via devices 814-816. Baseband and RF processor 810 contains typical elements, such as a microprocessor with associated memory and firmware, as well as loadable software. Input devices 830-835 are internally connected to relevant internal components via internal local network 851. They communicate directly with baseband and RF processor 810.

Device 830 is a motion sensor which could be used for gaming. This device has sensors for acceleration and/or motion; the data collected could be relative or absolute. Device 831 is an electronic cash account which provides for a secure means to store cash or cash equivalents on end user device 800 to include a means to send or receive cash or cash equivalents. The electronic cash account could be used to pay for accessing forward path modified content. This sub-device could also be an electronic credit card or some other electronic payment means like PayPal™.

Device 833 is a digital camera. Device 834 is a digital video camera. Device 835 is a microphone for audio input. Again, as previously described, all of the input sub-devices 830-835 are internally connected within end user device 800 via local network 851; sub-devices 830-835 also receive power and other signaling via battery/buss 840. Device 850 is a keypad or touch-screen. This is an input device connected to internal network 851. Communication devices 801-806 generally are wireless in nature, but 806 could be wired. As previously discussed, most end user devices would not have this many methods to communicate; rather, the end user device would have a subset of the means listed herein.

Device 801 is typically a satellite receiver for a data service from a high powered satellite such as Sirius Radio or XM Radio. It could also be future satellites such as those from Mobile Satellite Ventures (MSV). The advantage of satellite signals is that they can cover a very large geographic area for conveying the modified forward path. For Mobile Satellite Ventures, their architecture intends to use spot beams, albeit still covering a relatively large geographic area. Device 801 could also be a bi-directional satellite transceiver, meaning it could also transmit as well as receive from satellites.

Device 802 is a cellular transceiver. It could be multi-frequency mode, multi-access mode (GSM and CDMA), or multi-air interface protocol, such as 1×RTT and EVDO. Device 803 is a WiFi transceiver generally conforming to the "802" standards. Device 804 is a WiMax transceiver. WiMax networks are being deployed as of this filing and offer the advantage of wider area coverage (longer link distances) than does WiFi, which generally is considered and used for shorter distance communications. For either WiFi or WiMax, the communication is typically packet switched and uses versions of the IP protocol, albeit wirelessly. Device 805 is a very short range Bluetooth transceiver. Device 806 is some other communication means to include wired communications.

The output devices of end user device 800 are 814-816. Device 814 is a motion output device. This could be a shaker or something more sophisticated, such as that in the Wii™ video game controller. It is designed to provide physical and sensory feedback to the end user or end user device. Device 815 is a video display. The display is likely digital in nature and would provide a high resolution (a large number of pixels) image capable of displaying images, video, games, and the like. It is anticipated that end user device 800 could also communicate an image, video, or visual information via a short range means such as Bluetooth to a remote monitor or display. Device 816 is for audio output. It could be via speakers mounted on the end user device, via wired or wirelessly connected headphones, or via a Bluetooth connection to a remote sound system, for example.

Modified Multi-Media Content

Figure 9:
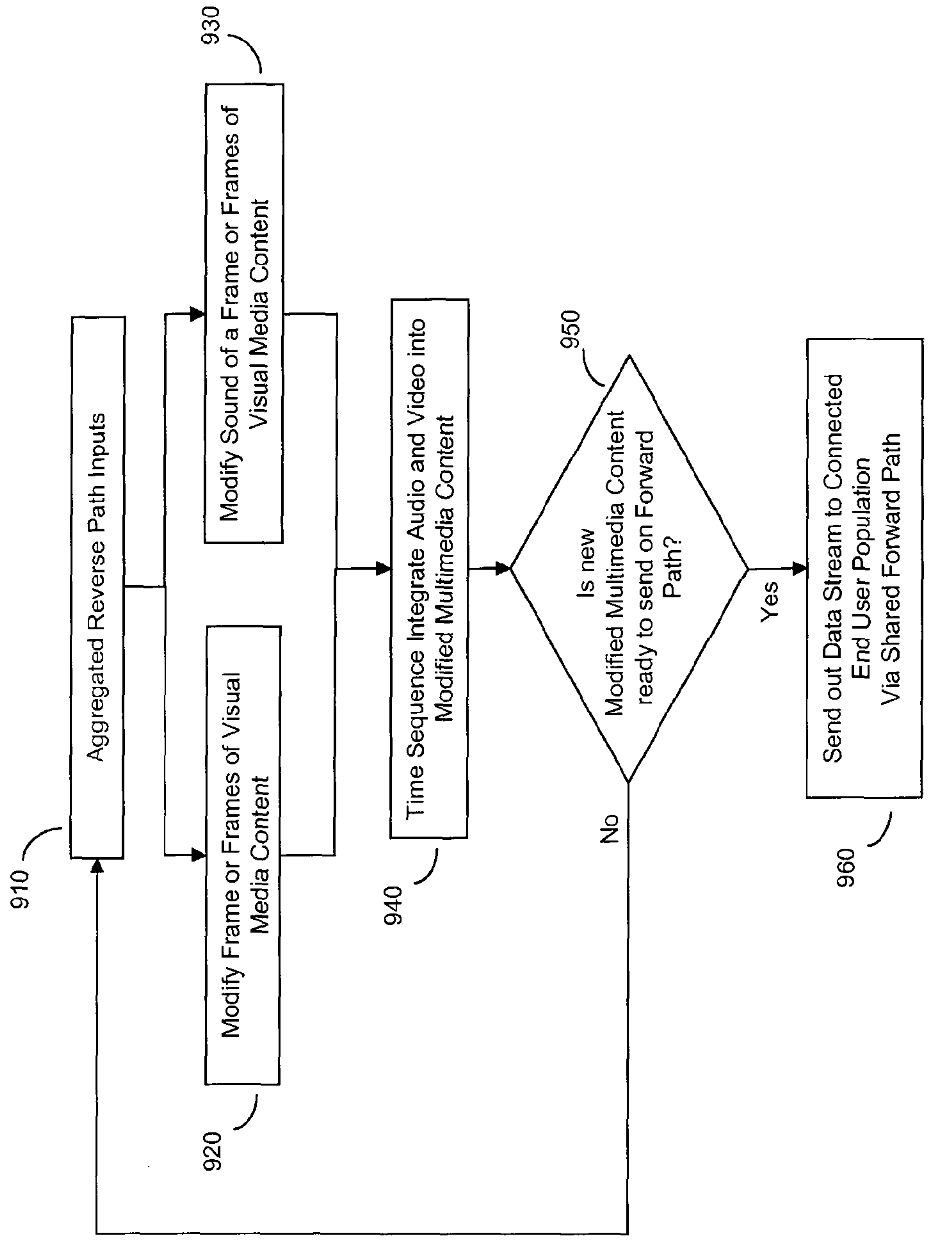
FIG. 9 illustrates, in flow diagram form, the process to modify forward path video and audio based on aggregated reverse path input.

FIG. 9 is a representative flowchart for modifying multi-media content. At step 910, the reverse path inputs from the then connected end users are aggregated, in a fashion already described herein. At step 920, individual frames of the visual content are modified; and at 930, the aural information is also modified. At step 940, in a time synchronous fashion, the visual and aural information is re-integrated. Step 950 determines if there is enough modified content to send via the forward path. If there is sufficient modified forward path data, at step 960, the modified content is sent via a shared forward path. However, at step 950, if sufficient frames are not ready to be sent, step 950 buffers the completed modified frames and then returns to the process flow back to step 910 to create more modified frames until such time as there are sufficient frames to send, application determinate.

Gaming System with End User Feedback—Registration and Authentication

Registration and authentication for the Gaming System With End User Feedback is similar to other registration and authentication processes well known in the art. One key difference is that the Gaming System With End User Feedback may be operating across multiple different air interfaces in a given region, which is different than a sole cellular network or WiFi provider, for instance. In fact, the Gaming System With End User Feedback may be a contracted service to a variety of other service providers wherein the Gaming System With End User Feedback controls the modification and distribution of content, while other service providers operate the networks that are conveying the forward path modified content. It could also be true that the reverse path and the forward path do not belong to the same service provider. Thus, a centralized or regionalized Gaming System With End User Feedback registration and authentication system is desired.

Figure 10:
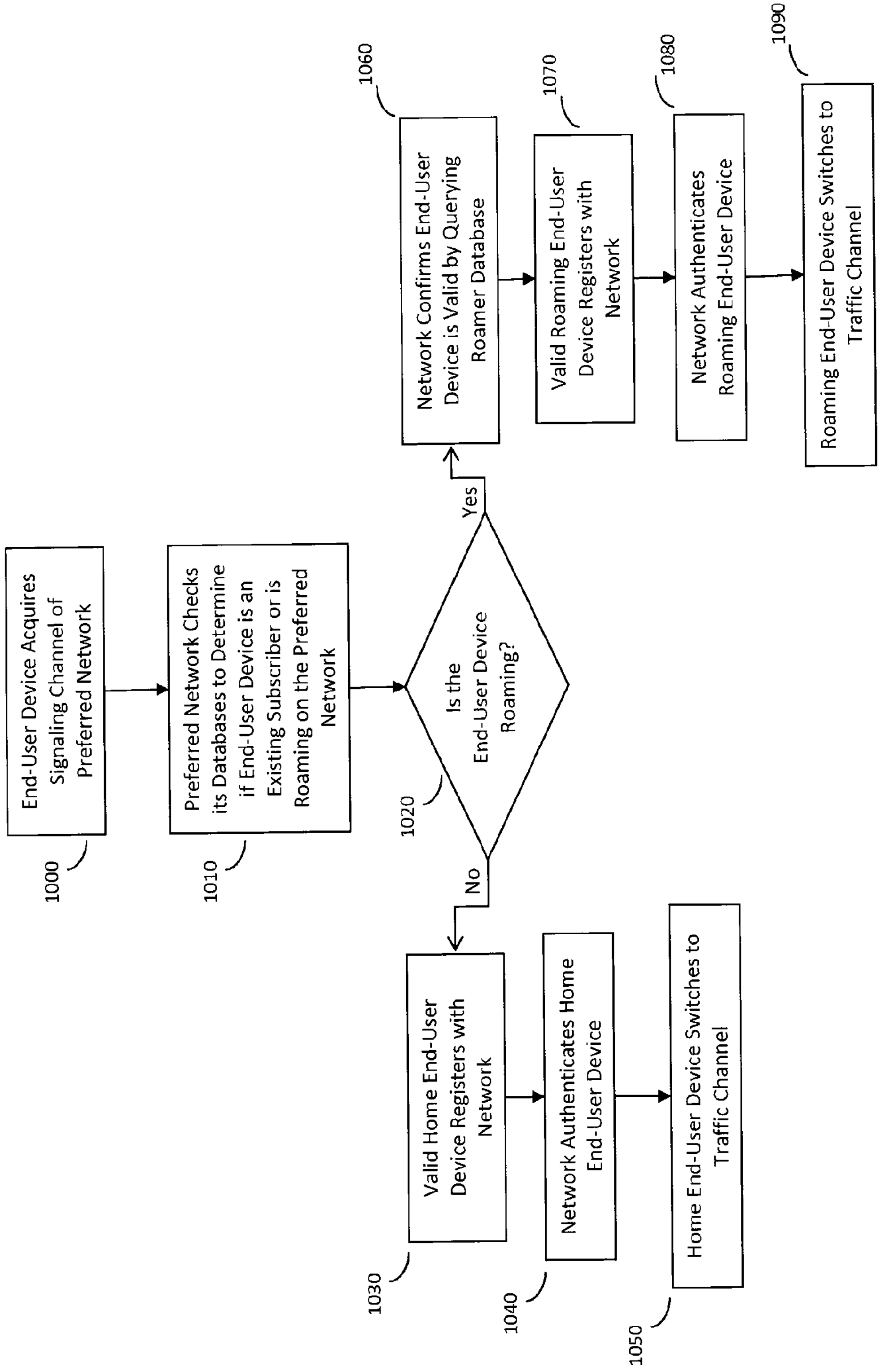
FIG. 10 illustrates, in flow diagram form, the registration and authentication of an end user device with the Gaming System With End User Feedback.

In FIG. 10 at step 1000, the end user device communicates with the then preferred network via that network's signaling channel. At steps 1010 and 1020, the then preferred network checks to see if the end user device is a home customer or a roaming customer. At step 1030, the customer was determined to be a home customer after a home database check, and the end user device registers with the then preferred network. To prevent fraud, the then preferred network authenticates the end user in a known fashion at step 1040. At step 1050, the end user is permitted access to the Gaming System With End User Feedback to include whatever content that customer is permitted access to via the traffic channel.

If the customer is a roamer, the Gaming System With End User Feedback checks the roamer database to confirm it is a valid device. Once confirmed to be valid, the end user device is registered at step 1070, authenticated at step 1080, and permitted access to allowed traffic channel(s) at step 1090.

Gaming System with End User Feedback—Billing

Figure 11:
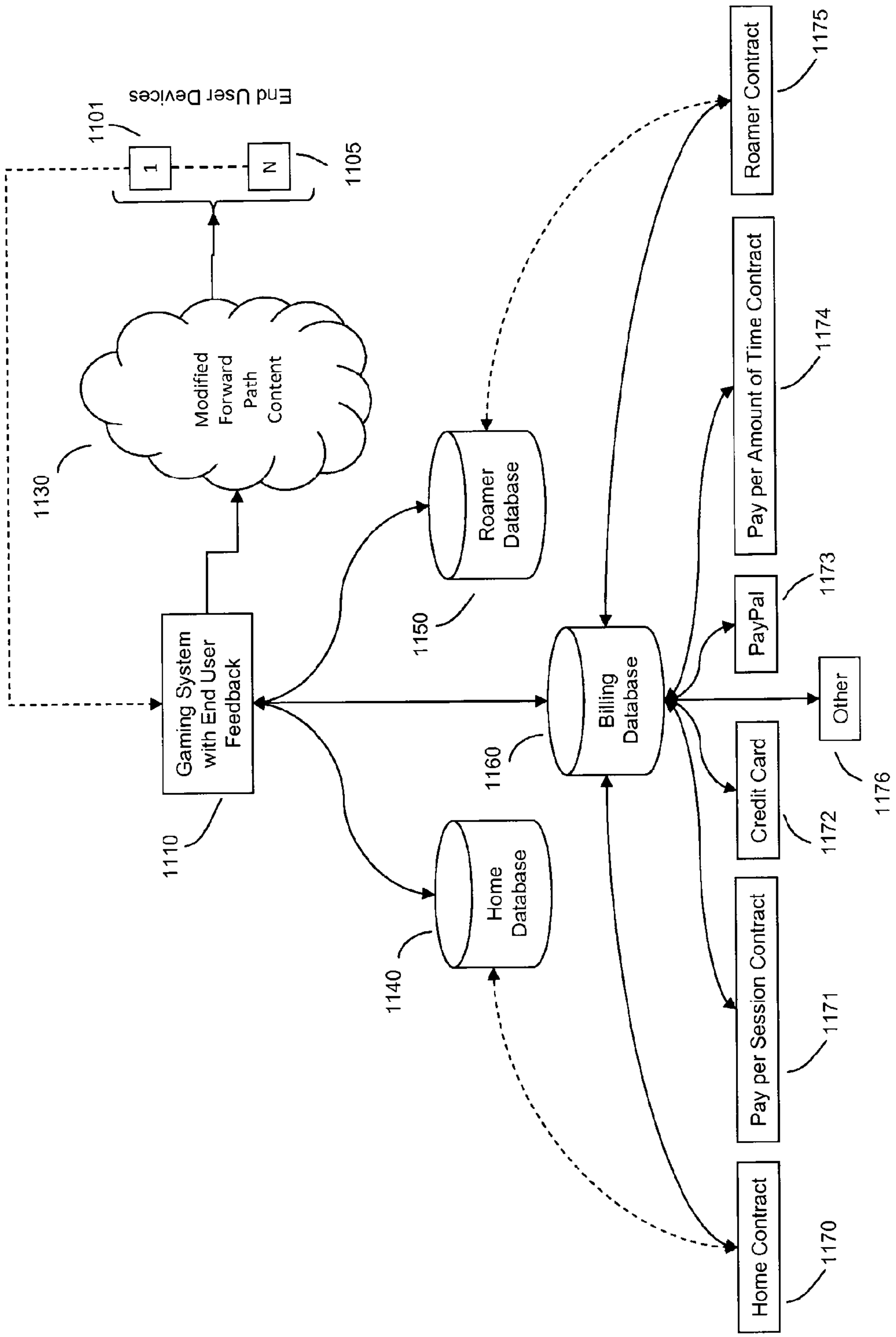
FIG. 11 illustrates, in flow diagram form, the billing process for the Gaming System With End User Feedback.

FIG. 11 describes a composite system block diagram that also shows one embodiment of the billing architecture. End user devices 1101-1105, where 1105 is the then connected Nth device, provide forward path modification information to Gaming System With End User Feedback 1110 via a reverse path connection. The Gaming System With End User Feedback collects all of the feedback from all of the then connected end user devices, in this case 1-N, and does this collection within some time window as already described herein. The Gaming System With End User Feedback also has hardware, software, firmware, and associated algorithms to modify the forward path content stream based on the aggregated reverse path feedback. After the forward path content is modified, it is delivered to the forward path communication channel, typically wireless, via network 1130. This content is multicasted back to the then connected set of end user devices, 1101-1105. The casting of the forward path enables simultaneous sharing of the content among all of the then connected end user devices which realizes orders of magnitudes in network operating efficiency. Connected to the Gaming System With End User Feedback 1120 are three types of databases: the Home Database 1140, the Roamer Database 1150, and the Billing Database 1160. Devices 1140 and 1150 are integral to the steps described in FIG. 10, registration and authentication.

Billing Database 1160 is further connected to additional physical and/or logical devices which permit a variety of billing methods. The Home Contract 1170 would be similar to a typical cellular, WiFi, or internet service contract wherein the given month's Gaming System With End User Feedback activity would be billed once per month to the customer. The Home Contract 1170 has a dotted line connection to the Home Database 1140. Similarly, the Roamer Contract 1175 has a dotted line connection to the Roamer Database 1150. In cellular parlance, the Roamer Database is often call the Visitor Location Register (VLR), while the Home Database is often called the Home Location Register (HLR).

Other billing methods include: a Pay Per Session Contract 1171, which could be used for an application that had a known end time; a Credit Card 1172; a PayPal™ account 1173; a Pay Per Amount Of Time Contract 1174; or Other 1176. Each of these payment methods is not necessarily mutually exclusive and could be simultaneously present given a particular customer's preferences.

Summary

The Gaming System With End User Feedback architecture enables end user devices to share a common wireless forward path of a multicast communication architecture in which the forward path delivered content is dynamically changed or modified based on a real-time, near-real-time, or delay-time basis via aggregated reverse path feedback from at least one of a plurality of end user devices. The Gaming System With End User Feedback periodically or continuously aggregates the feedback input received via the reverse path (having wired and/or wireless connectivity), modifies the forward path multi-media content, and delivers this dynamically modified multi-media content to the then connected population of end user devices via a wireless forward path multicast in a repetitive closed loop fashion.

The invention claimed is:

1. A multi-media gaming system having end user feedback and operational in a communication network which serves a plurality of wireless end user gaming devices, comprising:

content distribution server, connected to a cellular multi-casting network that serves a plurality of wireless end user gaming devices, for simultaneously transmitting gaming content from a gaming content source to a group of wireless end user gaming devices, comprising a set of selected ones of wireless end user gaming devices, over a single unidirectional forward broadcast path of the cellular multi-casting network that extends from the content distribution server to the selected wireless end user gaming devices;

feedback communication link of the cellular multi-casting network, having bidirectional paths, which are separate from the single unidirectional forward broadcast path, for each of the selected wireless end user gaming devices, including a private reverse path from each of the selected wireless end user gaming devices to the content distribution server and a private forward path that extends from the content distribution server to the selected wireless end user gaming devices, comprising:

feedback aggregator, responsive to receipt of gaming input data relating to the gaming source received from at least one selected wireless end user gaming device over the private reverse path of the bidirectional link, for accumulating the gaming input data relating to the gaming source received from the selected wireless end user gaming devices over the private reverse paths; and feedback integrator for generating a modified gaming content by modifying gaming content received from the gaming source based on the accumulated gaming input data received from the selected wireless end user gaming devices over their private reverse paths.

2. The multi-media gaming system having end user feedback of claim 1 further comprising:

content delivery transmitter for transmitting said modifying gaming content to the content distribution server for transmission over the forward broadcast path to the selected wireless end user gaming devices.

3. The multi-media gaming system having end user feedback of claim 1 wherein the feedback aggregator comprises:

synchronizer for associating the gaming input data received from the wireless end user gaming devices with a corresponding gaming content.

4. The multi-media gaming system having end user feedback of claim 3 wherein:

the gaming content comprises a series of frames that are delivered in sequence to the plurality of wireless end user gaming devices, wherein a past frame is a frame last delivered to the plurality of wireless end user gaming devices and a present frame is a frame received from the gaming content source but not yet delivered to the selected wireless end user gaming devices; and the feedback aggregator further comprises:

timer for defining a time period for use by the synchronization means during which time period the gaming input data received from the wireless end user gaming devices is associated with the present frame.

5. The multi-media gaming system having end user feedback of claim 4 wherein the feedback aggregator further comprises:

accumulated data processor for processing the accumulated gaming input data received from the wireless end user gaming devices to a composite content revision for a corresponding gaming application in the feedback integrator.

6. The multi-media gaming system having end user feedback of claim 5 wherein the feedback aggregator further comprises:

application updating for associating the composite content revision with a corresponding gaming application in the feedback integrator.

7. The multi-media gaming system having end user feedback of claim 6 wherein the feedback integrator comprises:

at least one gaming application, responsive to receipt of the composite content revision associated with the gaming application, for revising the received gaming content to produce a revised gaming content.

8. The multi-media gaming system having end user feedback of claim 4 wherein the feedback aggregator further comprises:

application updating for associating the accumulated gaming input data received from the wireless end user gaming devices with a corresponding gaming application in the feedback integrator.

9. The multi-media gaming system having end user feedback of claim 8 wherein the feedback integrator comprises:

at least one application, responsive to receipt of said accumulated gaming input data associated with the application, for revising the received gaming content to produce a revised gaming content.

10. The multi-media gaming system having end user feedback of claim 1 further comprising:

private data transmitter for transmitting end user specific private gaming data to a one of the selected wireless end user gaming devices over a corresponding private forward path of the bidirectional path.

11. The multi-media gaming system having end user feedback of claim 10 further comprising:

display, located at the wireless end user gaming device, for displaying the user specific private gaming data received at the wireless end user gaming device over the corresponding private forward path of the bidirectional path via a split screen concurrently with display of the gaming content delivered to the wireless end user gaming device over the unidirectional forward broadcast path.

12. The multi-media gaming system having end user feedback of claim 10 further comprising:

router, responsive to receipt of routing instructions from the selected wireless end user gaming device over the private reverse path of the bidirectional link, for forwarding the end user specific private gaming data to at least one other of the selected wireless end user gaming devices.

13. The multi-media gaming system having end user feedback of claim 12 further comprising:

private data transmitter for transmitting the end user specific private gaming data received at the router to the at least one selected wireless end user gaming device over a corresponding private forward path of the bidirectional path.

14. The multi-media gaming system having end user feedback of claim 1 further comprising:

router, responsive to receipt of the user gaming input from the selected wireless end user gaming device over the private reverse path of the bidirectional link, for forwarding the user gaming input to at least one other of the selected wireless end user gaming devices.

15. The multi-media gaming system having end user feedback of claim 14 further comprising:

private data transmitter for transmitting the end user gaming data received at the router to the at least one selected wireless end user gaming device over a corresponding private forward path of the bidirectional path.

16. A method of operating a multi-media gaming system having end user feedback and which is operational in a communication network which serves a plurality of wireless end user gaming devices, comprising:

simultaneously transmitting gaming content from a gaming content source, connected to a cellular multi-casting network that serves a plurality of wireless end user gaming devices, to a group of wireless end user gaming devices, comprising a set of selected ones of wireless end user gaming devices over a single unidirectional forward broadcast path of a cellular multi-casting network that extends from a content distribution server to the selected wireless end user gaming devices;

operating a feedback communication network of the cellular multi-casting network, having bidirectional paths, which are separate from the single unidirectional forward broadcast path, for each of the selected wireless end user gaming devices, including a private reverse path from each of the selected wireless end user gaming devices to the content distribution server and a private forward path that extends from the content distribution server to the selected wireless end user gaming devices, comprising:

aggregating feedback, in response to receipt of the gaming input data relating to the gaming source received from the at least one selected wireless end user gaming device over the private reverse path of their bidirectional link, the gaming input data relating to the gaming source received from all the selected wireless end user gaming devices on the respective said private reverse paths; and generating a modified gaming content by modifying gaming content received from the gaming source based on the accumulated gaming input data received from the selected wireless end user gaming devices over their private reverse paths.

17. The method of claim 16 further comprising:

transmitting the modified gaming content to said communication network for transmission over the forward broadcast paths to the selected wireless end user gaming devices.

18. The method of claim 16 wherein the step of accumulating comprises:

associating the gaming input data received from the wireless end user gaming devices with a corresponding gaming content.

19. The method of claim 18 wherein:

the gaming content comprises a series of frames that are delivered in sequence to the plurality of wireless end user gaming devices, wherein a past frame is a frame last delivered to the plurality of wireless end user gaming devices and a present frame is a frame received from the gaming content source but not yet delivered to the selected wireless end user gaming devices; and the step of accumulating further comprises:

defining a time period for use by the step of associating during which time period the gaming input data received from the wireless end user gaming devices is associated with the present frame.

20. The method of claim 19 wherein the step of accumulating further comprises:

processing the accumulated gaming input data received from the wireless end user gaming devices to a composite content revision for a corresponding gaming application.

21. The method of claim 20 wherein the step of accumulating further comprises:

associating the composite content revision with a corresponding gaming application.

22. The method of claim 19 wherein the step of accumulating further comprises:

associating the accumulated gaming input data received from the wireless end user gaming devices with a corresponding gaming application.

23. The method of claim 16 wherein the step of generating comprises:

operating at least one gaming application, responsive to receipt of the composite content revision associated with the gaming application, for revising the received gaming content to produce a revised gaming content.

24. The method of claim 16 wherein the step of generating comprises:

operating at least one application, responsive to receipt of the accumulated gaming input data associated with the application, for revising the received gaming content to produce a revised gaming content.

25. The method of claim 16 further comprising:

transmitting end user specific private gaming data to a one of the selected wireless end user gaming devices over a corresponding private forward path of the bidirectional path.

26. The method of claim 25 further comprising:

displaying, at the wireless end user gaming device, the user specific private gaming data received at the wireless end user gaming device over the corresponding private forward path of the bidirectional path via a split screen concurrently with display of the gaming content delivered to the wireless end user gaming device over the unidirectional forward broadcast path.

27. The method of claim 25 further comprising:

forwarding, in response to receipt of routing instructions from the selected wireless end user gaming device over the private reverse path of the bidirectional link, the end user specific private gaming data to at least one other of the selected wireless end user gaming devices.

28. The method of claim 27 further comprising:

transmitting the end user specific private gaming data received at the step of forwarding to the at least one selected wireless end user gaming device over a corresponding private forward path of the bidirectional path.

29. The method of claim 16 further comprising:

forwarding, in response to receipt of the user gaming input from the selected wireless end user gaming device over the private reverse path of the bidirectional link, the user gaming input to at least one other of the selected wireless end user gaming devices.

30. The method of claim 29 further comprising:

transmitting the end user gaming data received at the step of forwarding to the at least one selected wireless end user gaming device over a corresponding private forward path of the bidirectional path.

* * * * *